(12) United States Patent
Yosui (10) Patent No.: US 9,431,698 B2
(45) Date of Patent: Aug. 30, 2016

(54) WIRELESS COMMUNICATION DEVICE

(71) Applicant: Murata Manufacturing Co., Ltd., Nagaokakyo-shi, Kyoto-fu (JP)

(72) Inventor: Kuniaki Yosui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/262,933

(22) Filed: Apr. 28, 2014

(65) Prior Publication Data
US 2014/0231518 A1    Aug. 21, 2014

Related U.S. Application Data

(63) Continuation of application No. PCT/JP2013/057375, filed on Mar. 15, 2013.

(30) Foreign Application Priority Data

Mar. 26, 2012 (JP) .................. 2012-070204

(51) Int. Cl.
| | | |
|---|---|---|
| G06K 7/00 | (2006.01) |
| H01Q 1/50 | (2006.01) |
| H01Q 7/00 | (2006.01) |
| H04B 1/18 | (2006.01) |
| H01Q 1/22 | (2006.01) |
| H01Q 23/00 | (2006.01) |

(Continued)

(52) U.S. Cl.
CPC .......... *H01Q 1/50* (2013.01); *G06K 7/10009* (2013.01); *G06K 19/0723* (2013.01); *G06K 19/07749* (2013.01); *G06K 19/07794* (2013.01); *H01Q 1/2208* (2013.01); *H01Q 1/2216* (2013.01); *H01Q 7/00* (2013.01); *H01Q 23/00* (2013.01); *H04B 1/0458* (2013.01); *H04B 1/18* (2013.01); *H04B 5/0056* (2013.01); *H04B 5/0062* (2013.01); *H04B 5/0075* (2013.01); *H04B 5/0081* (2013.01); *G06K 7/10237* (2013.01)

(58) Field of Classification Search
USPC ................ 235/439, 492, 451, 380; 340/10.1, 340/572.5
See application file for complete search history.

(56) References Cited

U.S. PATENT DOCUMENTS 5,734,333 A * 3/1998 Levionnais .................. 340/13.1
7,783,254 B2 * 8/2010 Raggam et al. ............. 455/41.1

(Continued)

FOREIGN PATENT DOCUMENTS

JP    2002-334310 A    11/2002
JP    2005-235810 A    9/2005

(Continued)

OTHER PUBLICATIONS

Official Communication issued in International Patent Application No. PCT/JP2013/057375, mailed on Apr. 16, 2013.

*Primary Examiner* — Ahshik Kim
(74) *Attorney, Agent, or Firm* — Keating & Bennett, LLP (57) ABSTRACT

A wireless communication device includes a resistive-element-including RFIC and an antenna coil. The resistive-element-including RFIC includes an RFIC, a capacitive element, and resistive elements. The resistive elements and a portion of a circuit in the RFIC define a variable impedance circuit. The RFIC controls the impedance of a resistive circuit added to an antenna circuit in accordance with certain IO terminals set as output ports or input ports, thus obtaining a Q value of the antenna circuit in accordance with a communication speed.

17 Claims, 11 Drawing Sheets

(51) Int. Cl.
  *G06K 19/077* (2006.01)
  *H04B 5/00* (2006.01)
  *G06K 19/07* (2006.01)
  *H04B 1/04* (2006.01)
  *G06K 7/10* (2006.01)

(56) References Cited

U.S. PATENT DOCUMENTS

| 2005/0159913 | A1 | 7/2005 | Ariyoshi et al. |
| 2007/0102528 | A1* | 5/2007 | Inotani ..................... 235/492 |
| 2008/0084277 | A1 | 4/2008 | Korekoda |
| 2008/0210762 | A1* | 9/2008 | Osada et al. ............. 235/492 |
| 2009/0212917 | A1* | 8/2009 | Chang et al. ............ 340/10.1 |
| 2010/0060428 | A1* | 3/2010 | Lee et al. ................ 340/10.1 |
| 2010/0328045 | A1 | 12/2010 | Goto et al. |

FOREIGN PATENT DOCUMENTS

| JP | 2008-011341 A | 1/2008 |
| JP | 2008-085649 A | 4/2008 |
| JP | 2010-109806 A | 5/2010 |
| JP | 2011-010159 A | 1/2011 |
| JP | 4645762 B1 | 3/2011 |

* cited by examiner

| COMMUNICATION SPEED (kbps) | | IO SETTING | | | |
|---|---|---|---|---|---|
| | | 1a | 1b | 2a | 2b |
| (A) | 106 | in | in | in | in |
| (B) | 212 | in | in | out | out |
| (C) | 424 | out | out | in | in |
| (D) | 848 | out | out | out | out |

WIRELESS COMMUNICATION DEVICE

BACKGROUND OF THE INVENTION

1. Field of the Invention

The present invention relates to a wireless communication device preferably for use in an RFID (Radio Frequency Identification) system or a near field communication (NFC) system that communicates with a partner device via an electromagnetic field signal.

2. Description of the Related Art

NFC is a wireless communication standard combining contactless identification technology and interconnection technology. Devices conforming to this standard use a frequency in the 13.56 MHz band and perform bidirectional communication at a short distance of about a few tens of cm. There are multiple communication speeds (106 kbps, 212 kbps, 424 kbps, and 848 kbps) in NFC systems. Therefore, a wide-band antenna is necessary in order to perform communication without waveform distortion even at the highest communication speed.

A design technique for widening the band of an antenna includes, as described in Japanese Unexamined Patent Application Publication No. 2010-109806 and Japanese Patent No. 4645762, a technique that provides multiple resonant circuits close to one another, thereby performing multiple resonances and widening the band.

As in Japanese Unexamined Patent Application Publication No. 2010-109806 and Japanese Patent No. 4645762, in the technique which provides multiple resonant circuits close to one another, thereby performing multiple resonances, it is essential to form multiple LC resonant circuits, and it is thus necessary to secure sufficient spaced for the multiple LC resonant circuits. Thus, it is difficult to embed the LC resonant circuits in a small wireless communication device such as a mobile terminal.

In addition, if an antenna with wide-band characteristics is simply used, the antenna efficiency cannot be efficiently used at the time of low-speed communication, and it is impossible to secure a necessary communication distance with a small antenna. The Q value of an antenna is expressed as "Q=fo/B.W." (where B.W. is the bandwidth of the antenna, and Fo is the center frequency). In general, Q deteriorates as the bandwidth of an antenna becomes wider. That is, in the case of using an antenna with wide-band characteristics, the antenna is suitable for high-speed communication since the antenna itself is designed to be wideband. However, at the time of low-speed communication where no problem is caused even when the bandwidth is narrow, the antenna is used in a state where the Q value is poor.

SUMMARY OF THE INVENTION

Therefore, preferred embodiments of the present invention provide a small wireless communication device that secures a necessary band in accordance with a communication speed.

According to a preferred embodiment of the present invention, a wireless communication device includes a contactless communication IC including a communication terminal configured to transmit/receive a signal and a plurality of IO terminals, an antenna connected to the communication terminal of the contactless communication IC, and a variable impedance circuit connected to the antenna and configured such that an impedance thereof changes in accordance with states of the IO terminals.

With this configuration, the impedance of the variable impedance circuit connected in parallel to the antenna is set in accordance with the states of the IO terminals of the contactless communication IC so as to appropriately set a Q value of an antenna circuit and define a necessary bandwidth.

It is preferable that the variable impedance circuit include a circuit that is provided in the contactless communication IC and that extends between the IO terminals and a ground or between the IO terminals and a power line, and resistive elements connected between the IO terminals and the antenna.

With this configuration, only a small number of circuit elements connected to the outside of the contactless communication IC are needed and are configured in a simple circuit.

It is preferable that the variable impedance circuit be a circuit including switches that are connected between the terminals and the antenna and whose states are changed in accordance with output voltages of the IO terminals, and resistive elements connected in series to the switches.

With this configuration, the Q value of the antenna circuit is easily changed to many levels by using only a small number of IO terminals.

According to various preferred embodiments of the present invention, the impedance of the variable impedance circuit connected to the antenna is set in accordance with the states of the IO terminals of the contactless communication IC, thus appropriately setting the Q value of an antenna circuit and securing a necessary band in accordance with a communication speed. Therefore, it is unnecessary to provide and configure multiple LC resonant circuits, and a small wireless communication device is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
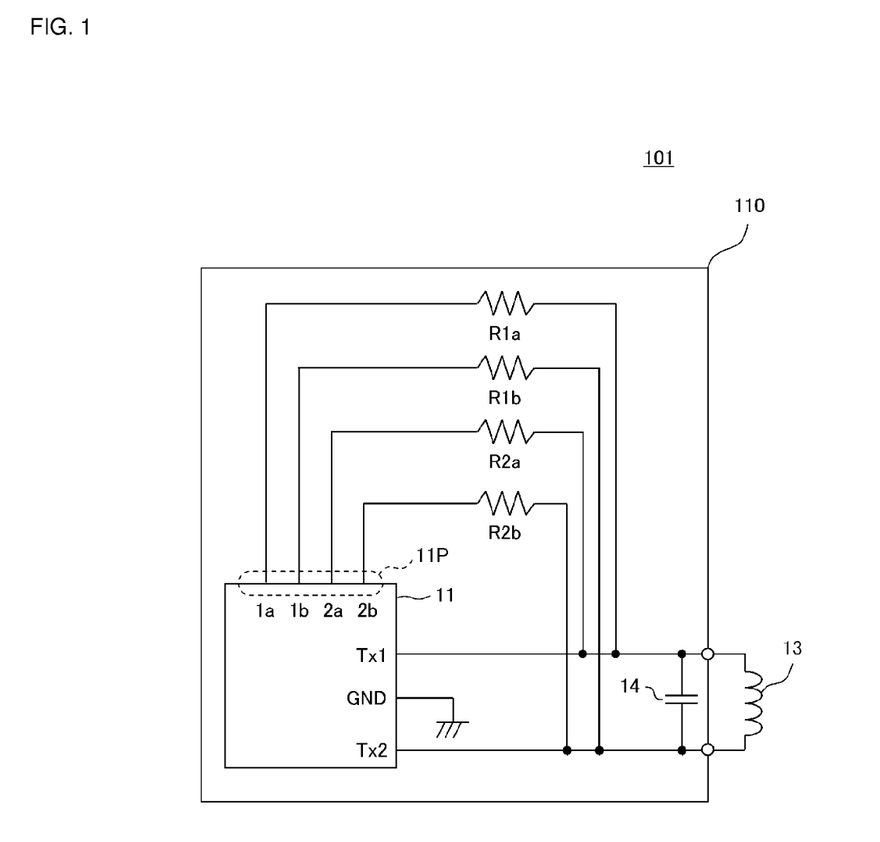
FIG. 1 is a circuit diagram of a wireless communication device 101 according to a first preferred embodiment of the present invention.

FIG. 1 is a circuit diagram of main portions of a wireless communication device 101 according to a first preferred embodiment of the present invention. The wireless communication device 101 includes a resistive-element-including RFIC 110 and an antenna coil 13. The resistive-element-including RFIC 110 includes an RFIC (a contactless communication IC) 11, a capacitive element 14, and resistive elements R1a, R1b, R2a, and R2b. The resistive elements R1a, R1b, R2a, and R2b and a portion of a circuit in the RFIC 11 configure a variable impedance circuit.

The RFIC 11 includes GPIO (General Purpose Input/Output) IO terminals 11P (1a, 1b, 2a, and 2b).

The RFIC 11 performs conversion between a baseband signal and a high-frequency signal. A control IC and the like are connected to the RFIC 11.

A parallel circuit of the capacitive element 14 and the antenna coil 13 is connected to two TX terminals (transmission signal terminals) Tx1 and Tx2 of the RFIC 11. Note that, although the antenna coil 13 is connected to the terminals Tx1 and Tx2 of the RFIC 11, the RFIC 11 performs not only transmission but also reception using the antenna coil 13 connected to the terminals Tx1 and Tx2.

The IO terminals 11P (1a, 1b, 2a, and 2b) of the RFIC are connected to first ends of the resistive elements R1a, R1b, R2a, and R2b, respectively. Second ends of the resistive elements R1a, R1b, R2a, and R2b are connected to either of two ends of the antenna coil 13.

These resistive elements R1a, R1b, R2a, and R2b may be chip resistors or may be resistive patterns provided on a circuit board, for example.

The capacitive element 14 defines, together with the antenna coil 13, an antenna circuit which is an LC parallel resonant circuit, and sets the resonant frequency of the antenna circuit to a certain frequency. The antenna coil 13 is configured to perform transmission/reception for near field communication by electromagnetically coupling with an antenna of a communication partner.

Figure 2:
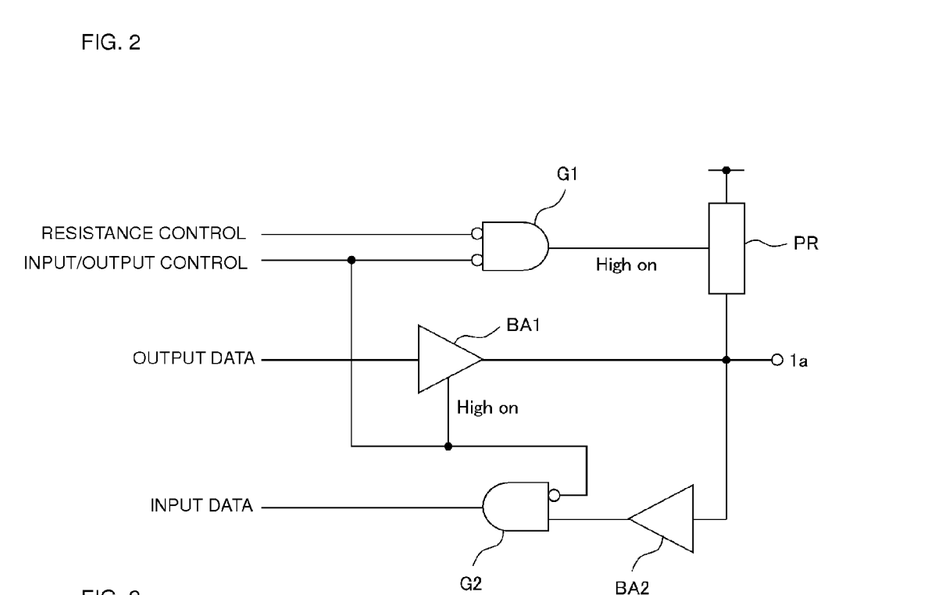
FIG. 2 is a circuit diagram of the interior leading to an IO terminal 1a, which is one of IO terminals 11P of an RFIC 11.

FIG. 2 is a circuit diagram of the interior leading to the IO terminal 1a, which is one of the IO terminals 11P of the RFIC 11. In this example, the IO terminals of the RFIC 11 are configured to be set to either of input or output. In the case where the IO terminal 1a is set as an output port in response to an input/output control signal, output data is output via a buffer BA1. At this time, in response to a resistor control signal, a pull-up resistor PR enters a "50Ω pull-up" state via a gate G1. In addition, since the input impedance of a buffer BA2 is very high, no effect is exerted as a result of the buffer BA2 being connected. In the case where the IO terminal 1a is set as an input port, input data is obtained via the buffer BA2 and a gate G2. At this time, in response to a resistor control signal, the pull-up resistor PR enters an "open" state via the gate G1. In addition, the output of the buffer BA1 has high impedance, and no effect is exerted as a result of the buffer BA1 being connected.

Therefore, in the case where the IO port 1a is set as an output port, the pull-up resistor PR is set to a "50Ω pull-up" state, and hence the IO terminal 1a is grounded with 50Ω in terms of high frequency. In the case where the IO port 1a is set as an input port, the IO terminal 1a has high impedance.

Figure 3:
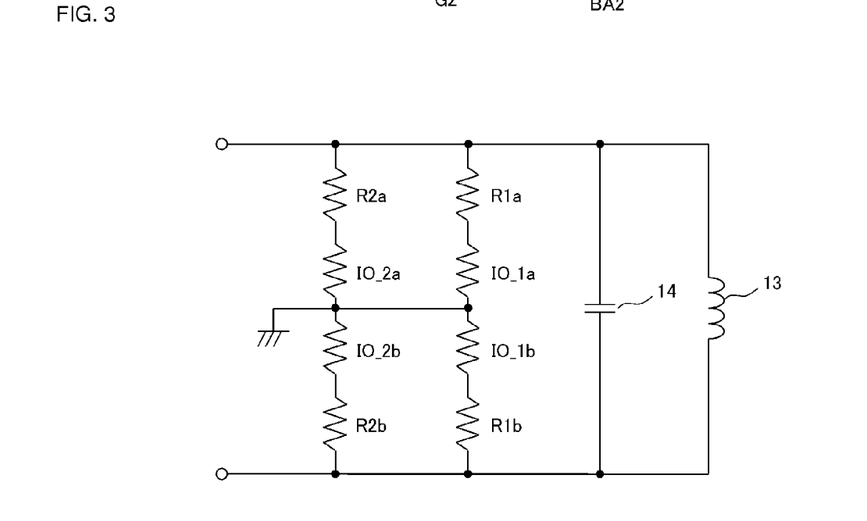
FIG. 3 is an equivalent circuit diagram of a variable impedance circuit connected to an antenna coil 13 and a capacitive element 14.

FIG. 3 is an equivalent circuit diagram of the variable impedance circuit connected to the antenna coil 13 and the capacitive element 14. Here, a resistance IO_1a represents, with the symbol of a resistive element, a resistance value of a circuit portion that is provided in the interior of the RFIC 11 and that leads to the IO terminal 1a. A resistance IO_1b represents, with the symbol of a resistive element, a resistance value of a circuit portion that is provided in the interior of the RFIC 11 and that leads to the IO terminal 1b. Similarly, a resistance IO_2a represents, with the symbol of a resistive element, a resistance value of a circuit portion that is provided in the interior of the RFIC 11 and that leads to the IO terminal 2a, and a resistance IO_2b represents, with the symbol of a resistive element, a resistance value of a circuit portion that is provided in the interior of the RFIC 11 and that leads to the IO terminal 2b.

As illustrated in FIG. 2, for example, in the case where the IO terminal 1a is set as an output port, the resistance IO_1a becomes 50Ω in terms of high frequency. In the case where the IO terminal 1a is set as an input port, the resistance IO_1a has high impedance.

The same applies to the other resistances IO_1b, IO_2a, and IO_2b illustrated in FIG. 3.

Figure 4:
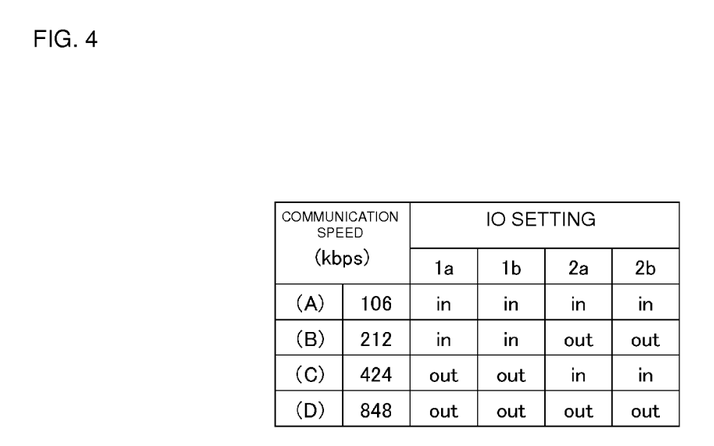
FIG. 4 is a diagram illustrating communication speeds and the states of IO terminals set in accordance with the communication speeds.
Figure 5A:
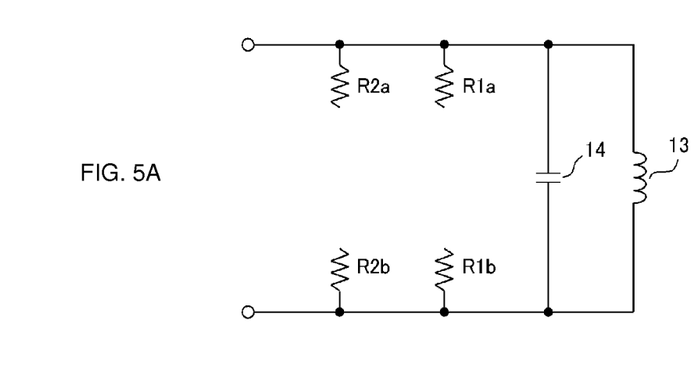
FIGS. 5A to 5D are equivalent circuit diagrams of the variable impedance circuit connected to the antenna coil 13 and the capacitive element 14, which correspond to states (A) to (D) in FIG. 4.
Figure 5B:
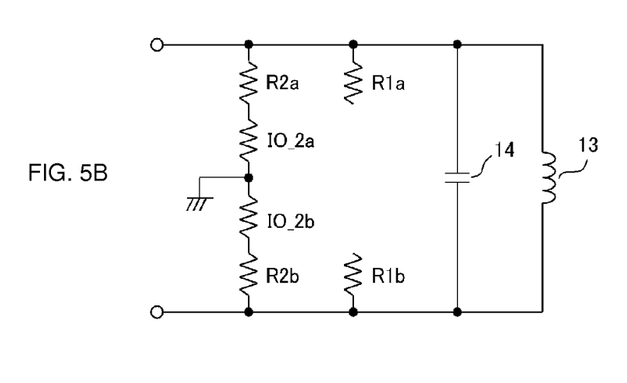
Figure 5C:
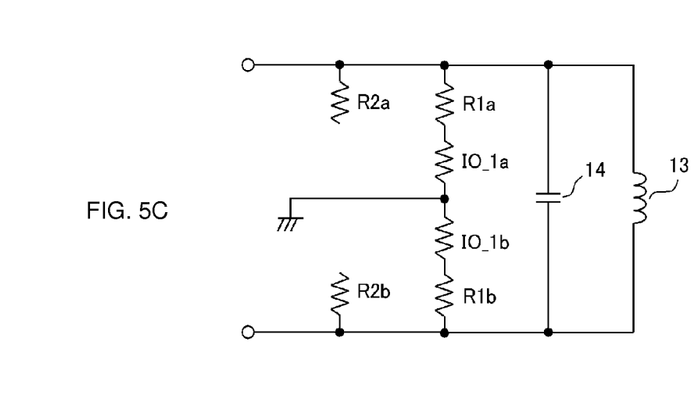
Figure 5D:
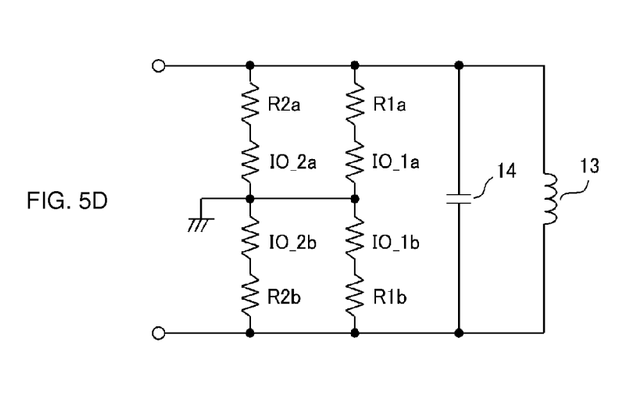

FIG. 4 is a diagram illustrating communication speeds and the states of the IO terminals set in accordance with the communication speeds. In the diagram, "in" represents setting as an input port, and "out" represents setting as an output port. In addition, FIGS. 5A to 5D are equivalent circuit diagrams of the variable impedance circuit connected to the antenna coil 13 and the capacitive element 14, which correspond to states (A) to (D) in FIG. 4.

When the resistance values of the resistive elements R1a, R1b, R2a, and R2b are represented by the same symbols, they are in the relationship R1a=R1b<R2a=R2b. It is assumed that the resistance values of the resistive elements R1a, R1b, R2a, and R2b are values within the range of, for example, about 1 kΩ to about 10 kΩ.

In the case where communication is performed at a communication speed of 106 kbps, as illustrated in the state (A) in FIG. 4, all of the resistances IO_1a, IO_1b, IO_2a, and IO_2b have high impedance, the Q value of the antenna circuit becomes highest, and the bandwidth becomes narrowest. In the case where communication is performed at a communication speed of 848 kbps, as illustrated in the state (D), all of the resistances IO_1a, IO_1b, IO_2a, and IO_2b become 50Ω, the Q value of the antenna circuit becomes lowest, and the bandwidth becomes widest. In the case where communication is performed at a communication speed of 212 kbps, as illustrated in the state (B), the resistances IO_1a and IO_1b have high impedance, and the resistances IO_2a and IO_2b become 50Ω. In the case where communication is performed at a communication speed of 424 kbps, as illustrated in the state (C), the resistances IO_1a and IO_1b become 50Ω, and the resistance values IO_2a and IO_2b have high impedance.

Note that FIG. 4 is only exemplary, and resistance values in accordance with the four communication speeds (necessary bandwidths are obtained) may be added (eight GPIO terminals are necessary). In addition, in the above diagram, the relationship may be R1a≠R1b and R1a≠R1b.

Second Preferred Embodiment

Figure 6:
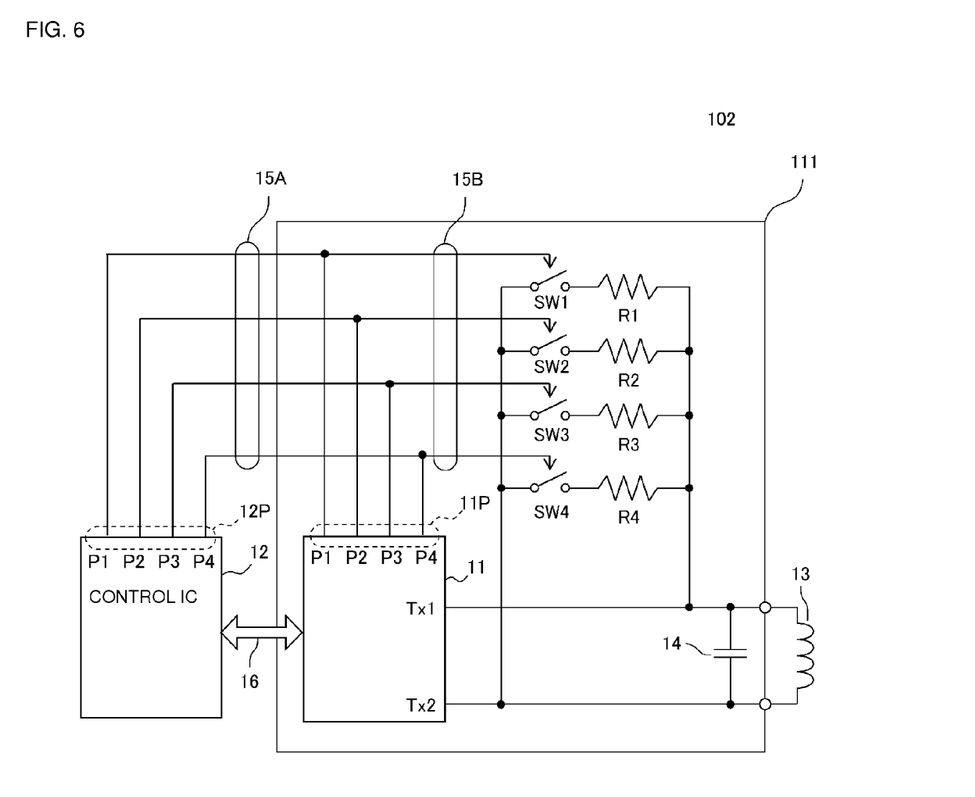
FIG. 6 is a circuit diagram of a wireless communication device 102 according to a second preferred embodiment of the present invention.

FIG. 6 is a circuit diagram of a wireless communication device 102 according to a second preferred embodiment of the present invention. The wireless communication device 102 is an example of an NFC module. The wireless communication device 102 includes a resistive-element-including RFIC 111, a control IC 12, and the antenna coil 13. The resistive-element-including RFIC 111 includes the RFIC (a contactless communication IC) 11, the capacitive element 14, the resistive elements R1a, R1b, R2a, and R2b, and switches SW1, SW2, SW3, and SW4. The resistive elements R1a, R1b, R2a, and R2b and the switches SW1, SW2, SW3, and SW4 configure a variable impedance circuit.

The RFIC 11 includes the GPIO (General Purpose Input/Output) IO terminals 11P (P1, P2, P3, and P4). The states of the switches SW1, SW2, SW3, and SW4 are changed in accordance with the output levels of these IO terminals. First ends of the resistive elements R1a, R1b, R2a, and R2b are connected to a first end of the antenna coil 13, and second ends of the resistive elements R1a, R1b, R2a, and R2b are connected to the switches SW1, SW2, SW3, and SW4, respectively.

The RFIC 11 performs conversion between a baseband signal and a high frequency signal. The control IC 12 controls the RFIC 11 and receives/outputs data including communication data.

A parallel circuit of the capacitive element 14 and the antenna coil 13 is connected to the two TX terminals (transmission signal terminals) Tx1 and Tx2 of the RFIC 11.

The IO terminals 11P of the RFIC 11 and IO terminals 12P of the control IC 12 are connected by signal lines 15A.

The RFIC 11 and the control IC 12 receive/output a communication signal via a data transmission line 16. The control IC 12 performs control including various settings of the RFIC 11 via the signal lines 15A. In addition, the RFIC 11 and the control IC 12 are connected to control terminals of the switches SW1, SW2, SW3, and SW4 via the signal lines 15A and 15B.

With a circuit illustrated in FIG. 6, the states of the switches SW1, SW2, SW3, and SW4 are changed in accordance with the output levels of the IO terminals P1, P2, P3, and P4 of the RFIC 11, thus changing the impedance of an additional circuit connected between two ends of the antenna coil 13. Similarly, the states of the switches SW1, SW2, SW3, and SW4 are also changed in accordance with the output levels of the IO terminals P1, P2, P3, and P4 of the control IC 12, thus changing the impedance of an additional circuit connected between the two ends of the antenna coil 13.

By appropriately defining the resistance values of the resistive elements R1a, R1b, R2a, and R2b, the impedance of an additional circuit connected between the two ends of the antenna coil 13 is set, and accordingly, the Q value of the antenna circuit is set to a value suitable for a communication speed.

By setting the resistance values of the resistive elements R1a, R1b, R2a, and R2b to be in a relationship of a power of two and by outputting binary code data from the IO terminals P1, P2, P3, and Pr, the impedance added to the antenna circuit is changed as power of two.

Third Preferred Embodiment

Figure 7:
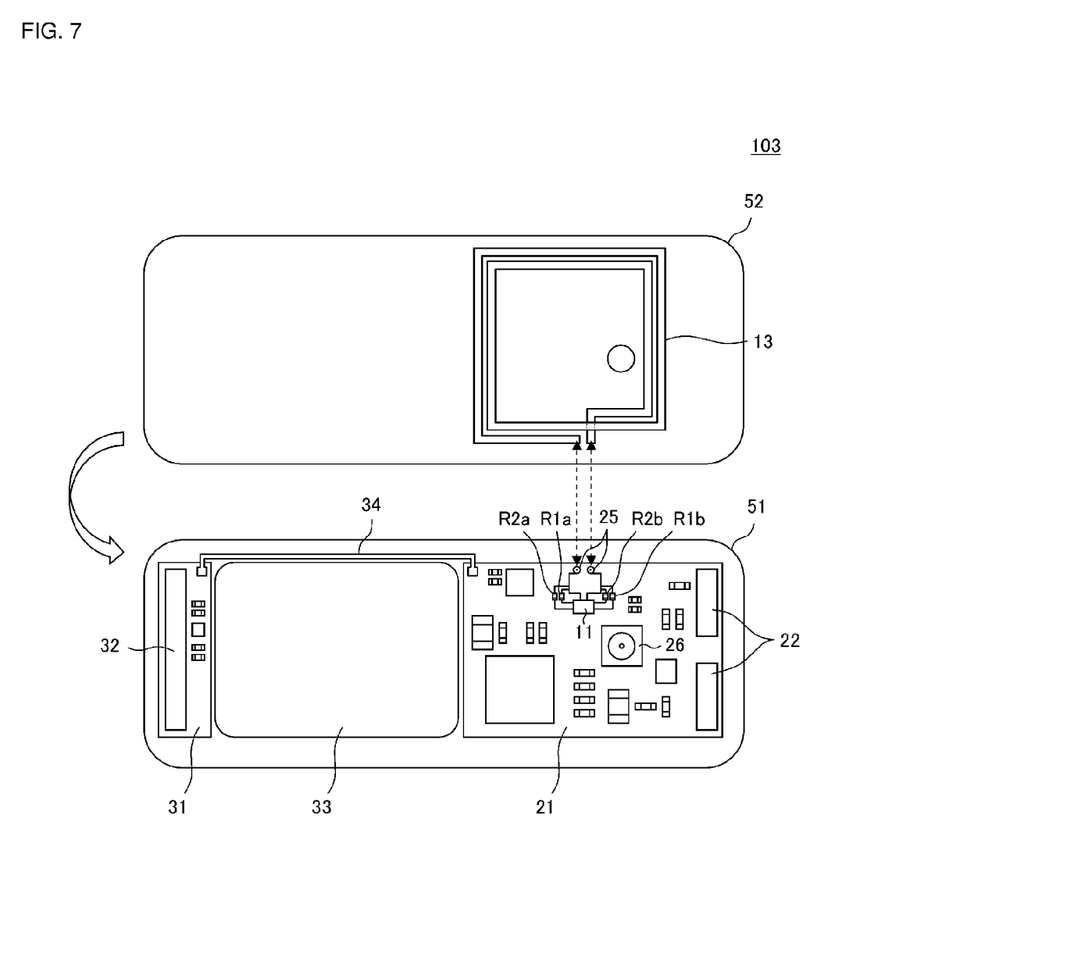
FIG. 7 is a diagram illustrating the configuration of the interior of a casing of a wireless communication device 103 according to a third preferred embodiment of the present invention, which is a plan view in a state in which a lower casing 51 and an upper casing 52 are separated to expose the interior.

FIG. 7 is a diagram illustrating the configuration of the interior of a casing of a wireless communication device 103 according to a third preferred embodiment of the present invention, which is a plan view in a state in which a lower casing 51 and a upper casing 52 are separated to expose the interior. The interior of the lower casing 51 accommodates printed-wiring boards 21 and 31, a battery pack 33, and the like. The RFIC 11 and the resistive elements R1a, R1b, R2a, and R2b are mounted on the printed-wiring board 21. A UFH-band antenna 22, a camera module 26, and the like are also mounted on the printed-wiring board 21. In addition, a UFH-band antenna 32 and the like are mounted on the printed-wiring board 31. The printed-wiring board 21 and the printed-wiring board 31 are connected via a coaxial cable 34.

The antenna coil 13 is provided in the interior of the upper casing 52. The antenna coil 13 preferably is a conductor patterned in a rectangular or substantially rectangular spiral, for example. End portions of the antenna coil 13 abut on pin terminals 25 provided on the printed-wiring board 21 side and are electrically conducting. That is, the antenna coil 13 is electrically connected to the RFIC 11 by joining the upper casing 52 and the lower casing 51.

The antenna coil 13 is preferably formed by, for example, the MID (Molded Interconnect Device) technique using the LDS (Laser-Direct-Structuring) method. That is, a material that mixes a base polymer such as a liquid crystal polymer (LCP) or a polybutylene terephthalate (PBT) with a filler and an organic metal is used and casted, the casting is irradiated with a laser in the pattern of the antenna coil 13, and a plating is deposited only in the irradiated portion.

Besides the method of directly rendering an antenna coil on a casing, a method of attaching a flexible substrate, on which an antenna coil is provided, to a casing via a double-sided adhesive sheet may be used.

Fourth Preferred Embodiment

Figure 8:
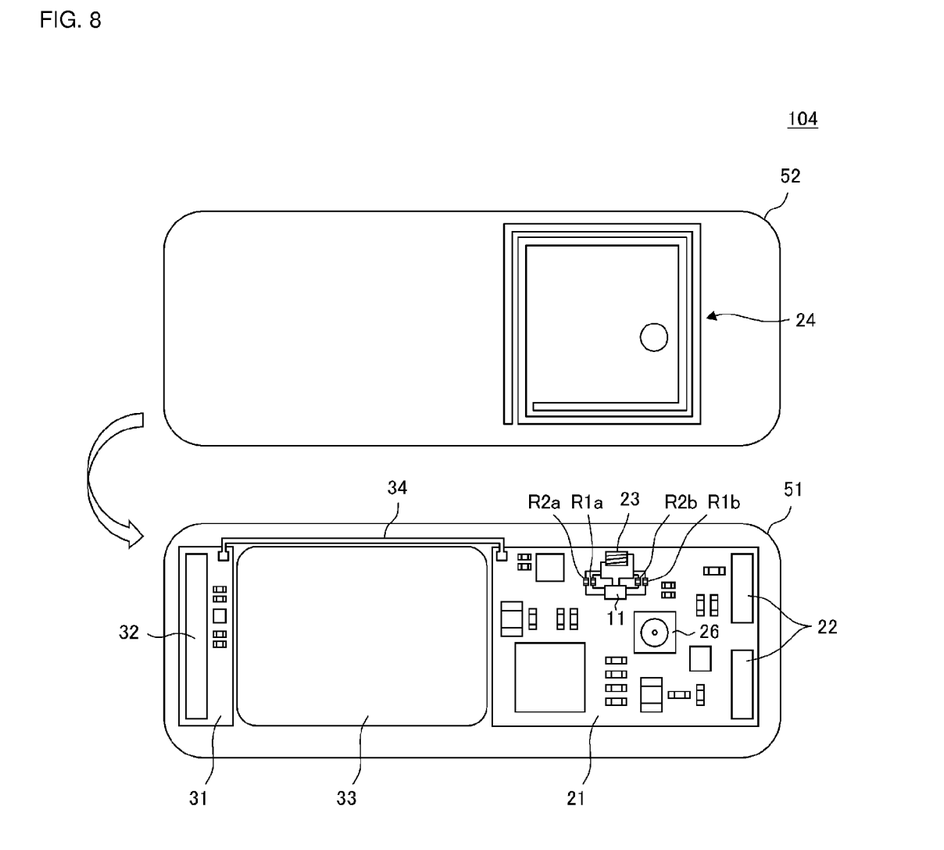
FIG. 8 is a diagram illustrating the configuration of the interior of a casing of a wireless communication device 104 according to a fourth preferred embodiment of the present invention, which is a plan view in a state in which the lower casing 51 and the upper casing 52 are separated to expose the interior.

FIG. 8 is a diagram illustrating the configuration of the interior of a casing of a wireless communication device 104 according to a fourth preferred embodiment of the present invention, which is a plan view in a state in which the lower casing 51 and the upper casing 52 are separated to expose the interior. The interior of the lower casing 51 accommodates the printed-wiring boards 21 and 31, the battery pack 33, and the like. The RFIC 11, the resistive elements R1a, R1b, R2a, and R2b, and a power feeding coil 23 are mounted on the printed-wiring board 21. The UFH-band antenna 22, the camera module 26, and the like are also mounted on the printed-wiring board 21. In addition, the UFH-band antenna 32 and the like are mounted on the printed-wiring board 31. The printed-wiring board 21 and the printed-wiring board 31 are connected via the coaxial cable 34.

A booster coil antenna 24 is provided in the interior of the upper casing 52. The booster coil antenna 24 magnetically couples with the power feeding coil 23, as will be described later, and operates as a magnetic field antenna.

Figure 9:
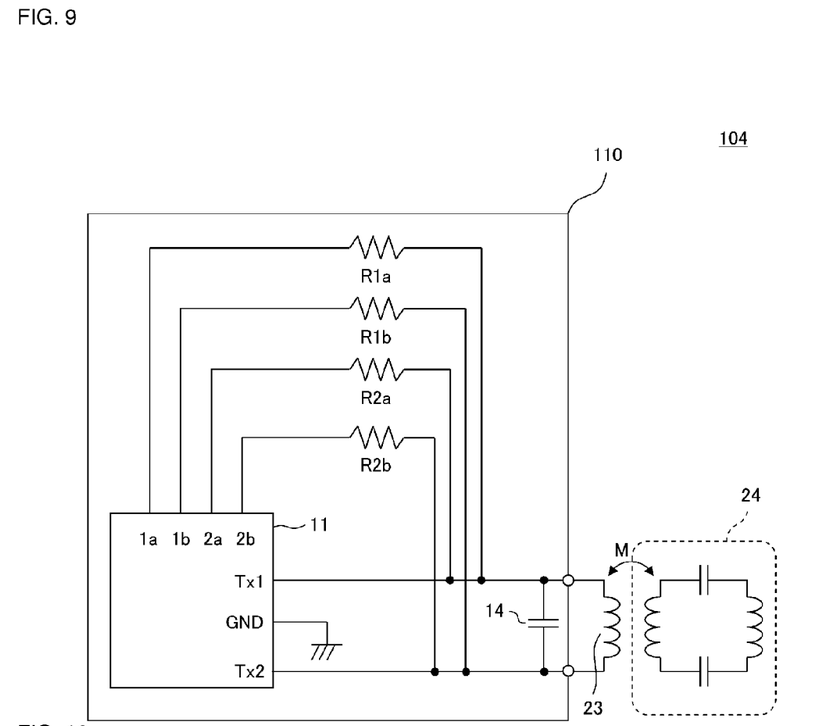
FIG. 9 is a circuit diagram of main portions of the wireless communication device 104 according to the fourth preferred embodiment of the present invention.

FIG. 9 is a circuit diagram of main portions of the wireless communication device 104 according to the fourth embodiment of the present invention. The wireless communication device 104 includes the RFIC 11, the capacitive element 14, and the resistive elements R1a, R1b, R2a, and R2b. A parallel circuit of the capacitive element 14 and the power feeding coil is connected between the Tx1 and Tx2 of the RFIC 11. The booster coil antenna 24 includes coils and capacitive elements, and the inductances of the coils and the capacitances of the capacitive elements determine a resonant frequency. The coil of the booster coil antenna 24 magnetically couples with the power feeding coil 23.

Figure 10:
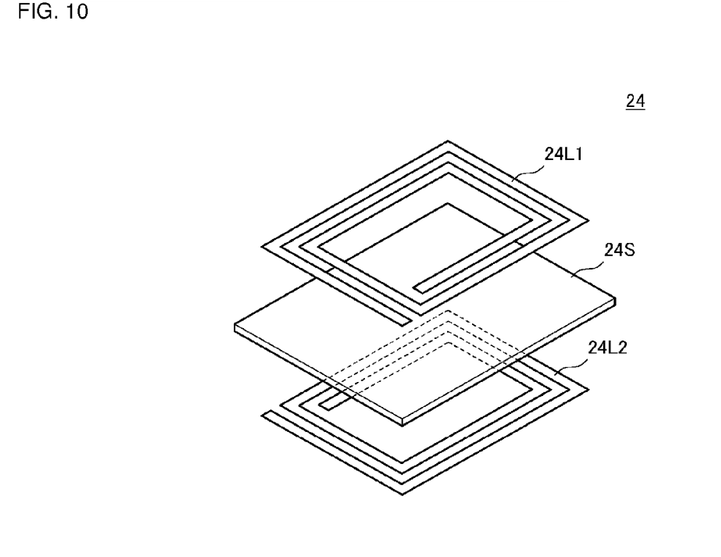
FIG. 10 is an exploded perspective view of a booster coil antenna 24 included in the wireless communication device 104 according to the fourth preferred embodiment of the present invention.

FIG. 10 is an exploded perspective view of the booster coil antenna 24. The booster coil antenna 24 includes an insulating sheet 24S and coil conductors 24L1 and 24L2 provided on two sides of the insulating sheet 24S. The coil conductors 24L1 and 24L2 preferably are conductors each patterned in a rectangular or substantially rectangular spiral, for example. The coil conductors 24L1 and 24L2 face each other across the insulating sheet 24S. The coil conductors 24L1 and 24L2 are patterned to be capacitively coupled to each other in a state where current flows in the same direction in plan view. The coil conductors 24L1 and 24L2 are patterned such that, when current flows clockwise through the coil conductor 24L1 in plan view from the same direction, current also flows clockwise through the coil conductor 24L2. The capacitive coupling is represented by the capacitive elements in the booster coil antenna 24 in FIG. 9.

The power feeding coil 23 and the booster coil antenna are arranged such that magnetic flux crosses the power feeding coil 23 and the booster coil antenna 24.

Figure 11:
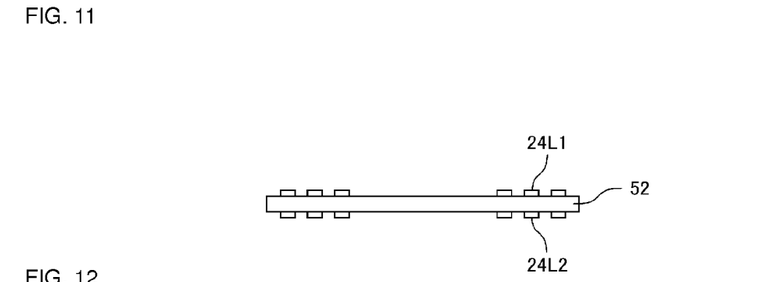
FIG. 11 is a sectional view of a booster coil antenna portion that is integral with the casing.
Figure 12:
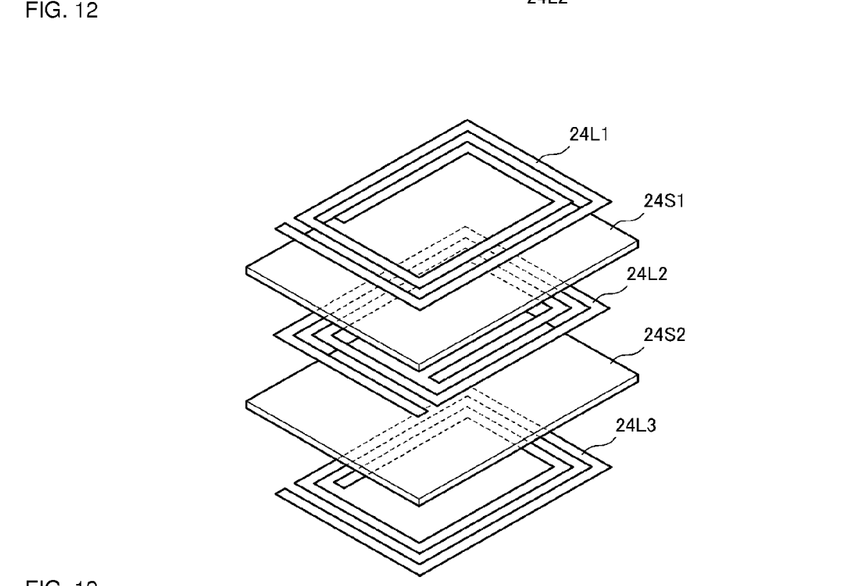
FIG. 12 is an exploded perspective view of another booster coil antenna included in the wireless communication device 104 according to the fourth preferred embodiment of the present invention.
Figure 13:
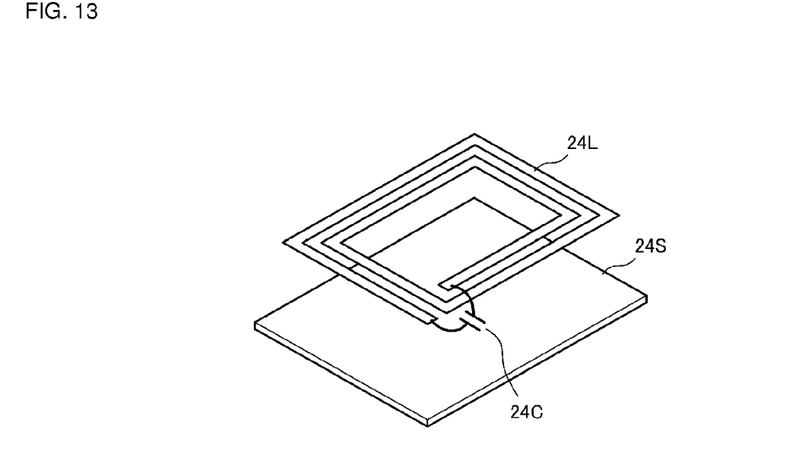
FIG. 13 is an exploded perspective view of yet another booster coil antenna included in the wireless communication device 104 according to the fourth preferred embodiment of the present invention.

FIGS. 11 to 13 are diagrams illustrating other exemplary configurations of the booster coil antenna. FIG. 11 is a sectional view of a booster coil antenna portion that is integrally formed with the casing. In this example, the coil conductors 24L1 and 24L2 are directly disposed on two sides of the upper casing 52 preferably using the LDS method or the like. FIG. 12 is an exploded perspective view of another booster coil antenna. In this example, the booster coil antenna includes two insulating sheets 24S1 and 24S2 and three coil conductors 24L1, 24L2, and 24L3. These coil conductors 24L1, 24L2, and 24L3 are patterned such that current in the same direction flows through the coil conductors in plan view from the same direction. As in this example, the coil conductor layers may be three or more layers. FIG. 13 is an exploded perspective view of yet another booster coil antenna. This booster coil antenna includes the insulating sheet 24S, and a coil conductor 24L and a chip capacitor located on one side of the insulating sheet 24S. As in this example, an LC resonant circuit may be configured using individual components, thus determining the resonant frequency.

Although the RFIC 11, the resistive elements R1a, R1b, R2a, and R2b, and the power feeding coil 23 are separately mounted on the printed-wiring board in the example illustrated in FIG. 8, the resistive elements R1a, R1b, R2a, and R2b may be mounted on the power feeding coil 23. In addition, the resistive elements R1a, R1b, R2a, and R2b are not limited to chip elements, and the resistive elements R1a, R1b, R2a, and R2b may be provided by resistive patterns or conductor patterns, for example.

Fifth Preferred Embodiment

Figure 14:
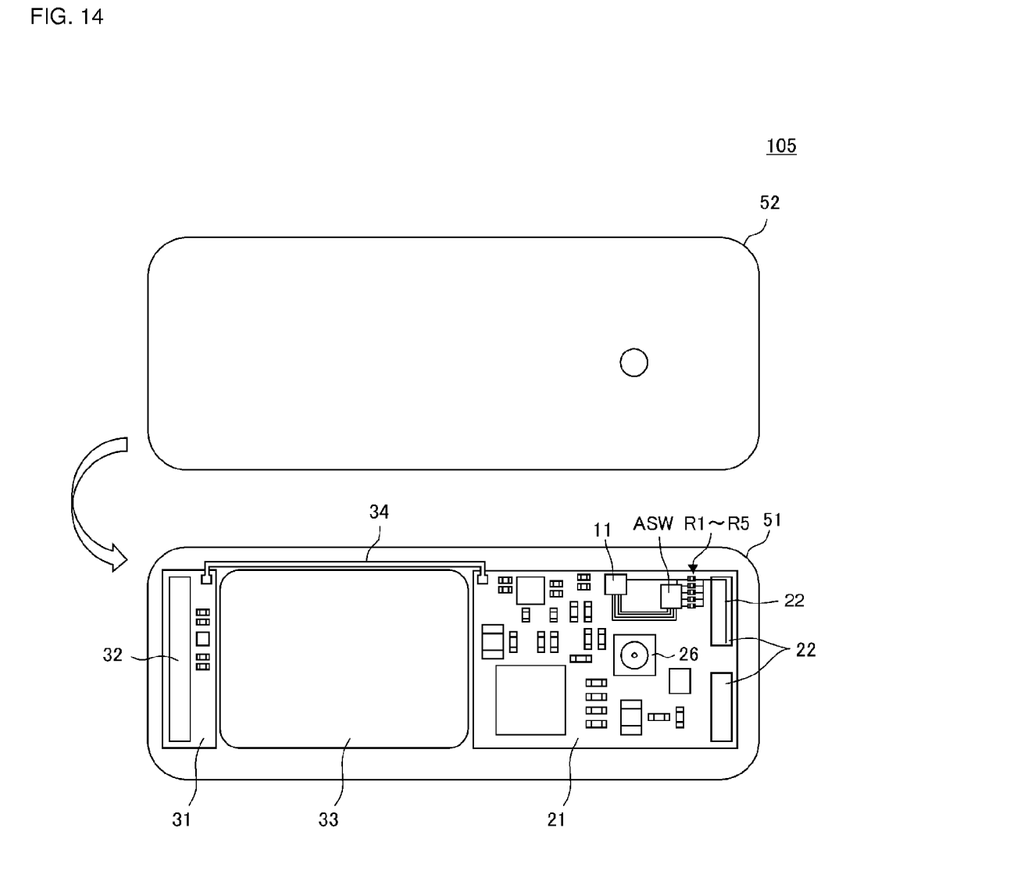
FIG. 14 is a diagram illustrating the configuration of the interior of a casing of a wireless communication device 105 according to a fifth preferred embodiment of the present invention, which is a plan view in a state in which the lower casing 51 and the upper casing 52 are separated to expose the interior.

FIG. 14 is a diagram illustrating the configuration of the interior of a casing of a wireless communication device 105 according to a fifth preferred embodiment of the present invention, which is a plan view in a state in which the lower casing 51 and the upper casing 52 are separated to expose the interior. The interior of the lower casing 51 accommodates the printed-wiring boards 21 and 31, the battery pack 33, and the like. The RFIC 11, a switch array ASW, and the resistive elements R1a, R1b, R2a, and R2b are mounted on the printed-wiring board 21. A conductor pattern of an antenna 22' is located on the printed-wiring board 21. In addition, the UFH-band antenna 22, the camera module 26, and the like are also mounted on the printed-wiring board 21. In addition, the UFH-band antenna 32 and the like are mounted on the printed-wiring board 31. The printed-wiring board 21 and the printed-wiring board 31 are connected via the coaxial cable 34.

Figure 15:
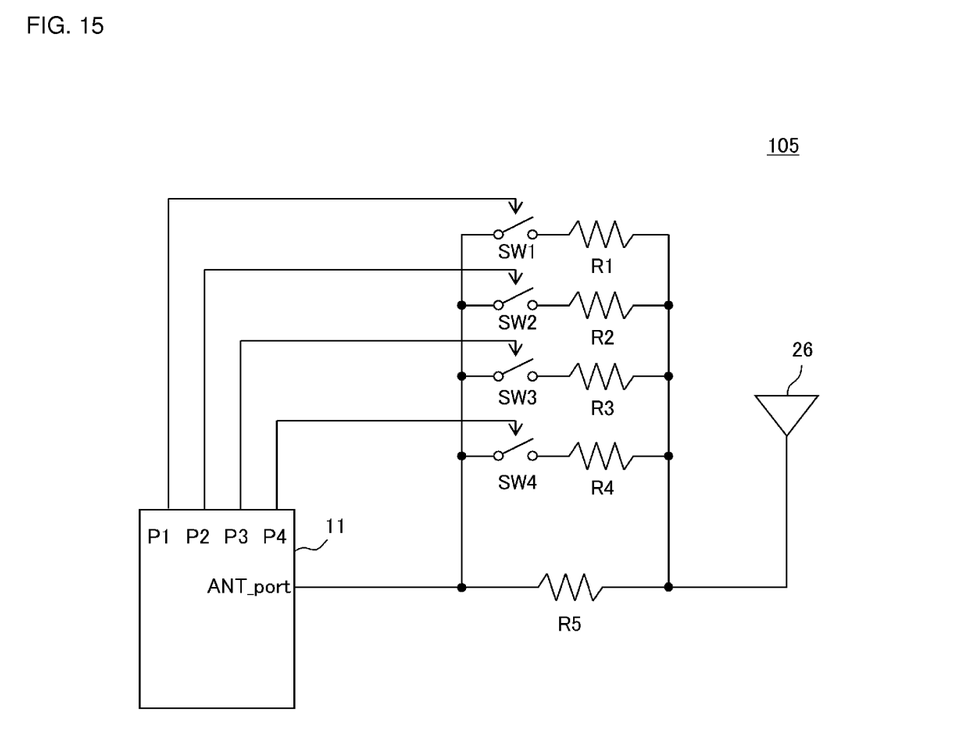
FIG. 15 is a circuit diagram of main portions of a wireless communication device 105 according to a fifth preferred embodiment of the present invention.

FIG. 15 is a circuit diagram of main portions of the wireless communication device 105 according to the fifth preferred embodiment of the present invention. The wireless communication device 105 includes the RFIC 11, the switches SW1, SW2, SW3, and SW4, and the resistive elements R1a, R1b, R2a, and R2b. The field emission-type antenna 22 is connected to an antenna port ANT_port of the RFIC 11 via a resistor R5. The switches SW1, SW2, SW3, and SW4 are provided in the switch array ASW illustrated in FIG. 14.

The resistance value between the antenna port ANT_port of the RFIC 11 and the antenna 22' is changed in accordance with a combination of the ON/OFF states of the switches SW1, SW2, SW3, and SW4, thus controlling the Q value of the antenna. In this manner, various preferred embodiments of the present invention are also applicable to a field emission-type antenna.

Although four switches are preferably used in the example illustrated in FIG. 15, the number of switches is not necessarily four. If fine adjustment is necessary, it is better to increase the number of switches; if fine adjustment is unnecessary, three or fewer switches may be used, for example.

Other Preferred Embodiments

Although the present invention has been described with reference to the specific preferred embodiments, the present invention is not limited to these examples.

For example, a high frequency device of the present invention is not limited to an RFID reader/writer and may be configured as an RFID tag. In addition, although the examples in which the Q value of the antenna preferably is controlled at the time of transmission/reception have been discussed in the preferred embodiments, the high frequency device of the present invention is applicable to an antenna dedicated for transmission or an antenna dedicated for reception in accordance with the purpose. In addition, the high frequency device according to various preferred embodiments of the present invention may be applied at the time of only one of transmission and reception. Furthermore, if the transmission timing and the reception timing are separated, the Q value of the antenna may be made different at the time of transmission and reception.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device comprising:
   a contactless communication IC including a communication terminal configured to transmit/receive a signal and an IO terminal;
   an antenna connected to the communication terminal of the contactless communication IC; and
   a resistive element connected between the IO terminal and the antenna; wherein
   the IO terminal is settable to define one of an input port and an output port based on an input/output control signal, and the IO terminal has a different impedance when defining an input port and when defining an output port.

2. The wireless communication device according to claim 1, further comprising a circuit that is provided in the contactless communication IC and between the IO terminal and a ground or between the IO terminal and a power line.

3. The wireless communication device according to claim 1, wherein
   the communication terminal includes two communication terminals;
   a first end and a second end of the antenna are connected to the two communication terminals, respectively;
   the IO terminal includes a first IO terminal and a second IO terminal;
   the resistive element includes a first resistive element and a second resistive element; and
   the first resistive element is connected between the first IO terminal and the first end of the antenna, and the second resistive element is connected between the second IO terminal and the second end of the antenna.

4. The wireless communication device according to claim 3, wherein
   the IO terminal further includes a third IO terminal and a fourth IO terminal;
   the resistive element further includes a third resistive element that has a resistance value different from the first resistive element and a fourth resistive element that has a resistance value different from the second resistive element; and
   the third resistive element is connected between the third IO terminal and the first end of the antenna, and the fourth resistive element is connected between the fourth IO terminal and the second end of the antenna.

5. The wireless communication device according to claim 1, wherein the resistive element and a portion of the contactless communication IC define a variable impedance circuit.

6. The wireless communication device according to claim 1, wherein the resistive element is one of a chip resistor and a resistive pattern.

7. The wireless communication device according to claim 1, further comprising a capacitive element that defines with the antenna an antenna circuit that is an LC parallel resonant circuit.

8. The wireless communication device according to claim 1, wherein the resistive element includes first, second, third and fourth resistive elements, resistance values of the first and second resistive elements being equal, resistance values of the third and fourth resistive elements being equal, and the resistance values of the first and second resistive elements being different from the resistance vales of the third and fourth resistive elements.

9. The wireless communication device according to claim 1, further comprising a casing and two printed-wiring boards provided in the casing, wherein the resistive element and the contactless communication IC are mounted on one of the two printed-wiring boards, the antenna is mounted on another of the two printed-wiring boards, and the two printed-wiring boards are connected to each other.

10. The wireless communication device according to claim 9, wherein the casing includes an upper casing and a lower casing.

11. The wireless communication device according to claim 1, wherein the antenna includes an antenna coil that is a conductor patterned in a rectangular or substantially rectangular spiral.

12. The wireless communication device according to claim 1, further comprising a booster coil antenna configured to magnetically couple with a power feeding coil to define a magnetic field antenna.

13. The wireless communication device according to claim 12, wherein the booster antenna includes coils and capacitive elements.

14. The wireless communication device according to claim 12, wherein the booster antenna includes coil conductors and insulating sheets.

15. The wireless communication device according to claim 1, wherein the antenna is a field emission antenna.

16. A high frequency device comprising the wireless communication device according to claim 1.

17. The high frequency device according to claim 16, wherein the high frequency device is one of an RFID reader/writer and an RFID tag.

* * * * *